(12) United States Patent
Chung

(10) Patent No.: US 8,605,072 B2
(45) Date of Patent: Dec. 10, 2013

(54) POWER CONTROL SYSTEM FOR DISPLAY MODULE INCLUDING EXTERNAL DC-DC CONVERTER

(75) Inventor: Ho-Ryun Chung, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 740 days.

(21) Appl. No.: 12/708,408

(22) Filed: Feb. 18, 2010

(65) Prior Publication Data

US 2011/0025667 A1 Feb. 3, 2011

(30) Foreign Application Priority Data

Aug. 3, 2009 (KR) .......................... 10-2009-0071301

(51) Int. Cl.
*G06F 3/038* (2013.01)
(52) U.S. Cl.
USPC ............. 345/211; 345/76; 345/208; 345/210; 345/82; 345/204
(58) Field of Classification Search
USPC .................................. 345/76–104, 204–211
See application file for complete search history.

(56) References Cited

U.S. PATENT DOCUMENTS

| | | | |
|---|---|---|---|
| 7,893,933 B2* | 2/2011 | Yi et al. | 345/211 |
| 7,990,373 B2* | 8/2011 | Xiao et al. | 345/211 |
| 2002/0015033 A1* | 2/2002 | Kim | 345/204 |
| 2003/0137502 A1* | 7/2003 | Lee | 345/212 |
| 2005/0110719 A1* | 5/2005 | Satoh et al. | 345/76 |
| 2006/0125715 A1* | 6/2006 | Choi | 345/14 |
| 2006/0176253 A1* | 8/2006 | Yazawa et al. | 345/82 |
| 2009/0058311 A1* | 3/2009 | Eom | 315/173 |
| 2010/0171733 A1* | 7/2010 | Kobayashi | 345/211 |

FOREIGN PATENT DOCUMENTS

| | | |
|---|---|---|
| KR | 10-2003-0063918 A | 7/2003 |
| KR | 10-2008-0064674 A | 7/2008 |

OTHER PUBLICATIONS

KIPO Registration Determination Certificate dated Oct. 25, 2011 for KR Application No. 10-2009-0071301 (5 pages).

* cited by examiner

*Primary Examiner* — Lun-Yi Lao
*Assistant Examiner* — Priyank Shah
(74) *Attorney, Agent, or Firm* — Christie, Parker & Hale, LLP

(57) ABSTRACT

A power control system includes a display module for displaying an image in accordance with image data, a DC-DC converter being external to the display module and for applying power to the display module, a host for generating a control signal for controlling the display module and outputting the control signal through a signal output pin of signal input/output pins of the host, and a connector connected to the signal input/output pins and for applying the control signal to the DC-DC converter and the display module. The DC-DC converter is adapted to apply power to the display module according to the control signal. Accordingly, the number of signal input/output pins of the connector can be reduced.

7 Claims, 4 Drawing Sheets

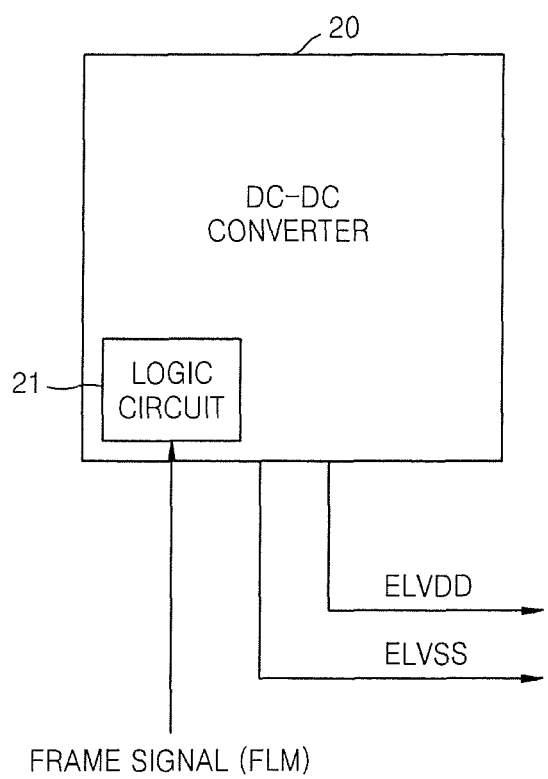

POWER CONTROL SYSTEM FOR DISPLAY MODULE INCLUDING EXTERNAL DC-DC CONVERTER

CROSS-REFERENCE TO RELATED PATENT APPLICATION

This application claims the benefit of and the priority to Korean Patent Application No. 10-2009-0071301, filed on Aug. 3, 2009, in the Korean Intellectual Property Office, the entire content of which is incorporated herein in its entirety by reference.

BACKGROUND

1. Field

An embodiment of the present invention relates to a power control system of a display module.

2. Description of the Related Art

Electronic appliances such as a mobile phone or a portable multimedia player (PMP) include a host for controlling the whole system and components that are connected to the host and perform various functions. Examples of the components are buttons for operating an electronic appliance and a display module for displaying an image in accordance with image data. The host is connected to the components via, for example, a connector to transmit to the components a control signal for controlling the components.

The connector for connecting the host and the components includes as many channels as the number of signals required for controlling the components. That is, if four signals are required, a cable having four channels may be used as the connector. However, the number of pins available in the host to input or output a signal is limited. Also, it is desirable to reduce the number of channels of the connector in order to reduce the volume of electronic appliances. Thus, research is being continuously conducted to reduce the number of pins used for connecting components.

SUMMARY OF THE INVENTION

An aspect of an embodiment of the present invention is directed to a power control system of a display module that includes an external direct current to direct current (DC-DC) converter, in which the number of pins of a connector can be reduced.

An embodiment of the present invention provides a power control system. The power control system includes a display module for displaying an image according to image data, a DC-DC converter being external to the display module and for applying power to the display module, a host for generating a control signal for controlling the display module and outputting the control signal through a signal output pin of signal input/output pins of the host, and a connector connected to the signal input/output pins and for applying the control signal to the DC-DC converter and the display module. The DC-DC converter is adapted to apply power to the display module according to the control signal.

The DC-DC converter may include a logic circuit that receives the control signal to turn on or off the DC-DC converter.

The control signal may be a frame signal that identifies a frame of the image data.

The host may be adapted to adjust a pulse period of the frame signal to turn on or off the DC-DC converter. Also, the host may be adapted to adjust a number of pulses of the frame signal to turn on or off the DC-DC converter.

The display module may display an image when the DC-DC converter is turned on by the frame signal.

The display module may include a display panel for displaying the image and a driving unit for driving the display panel in accordance with the received control signal.

The display panel may include an organic light emitting display (OLED) panel.

BRIEF DESCRIPTION OF THE DRAWINGS

The above and other features and aspects of the present invention will become more apparent by describing in detail exemplary embodiments thereof with reference to the attached drawings in which:

FIG. 2 is a schematic view illustrating the DC-DC converter of FIG. 1, according to an embodiment of the present invention;

DETAILED DESCRIPTION

The present invention will now be described more fully with reference to the accompanying drawings, in which exemplary embodiments of the invention are shown.

Figure 1:
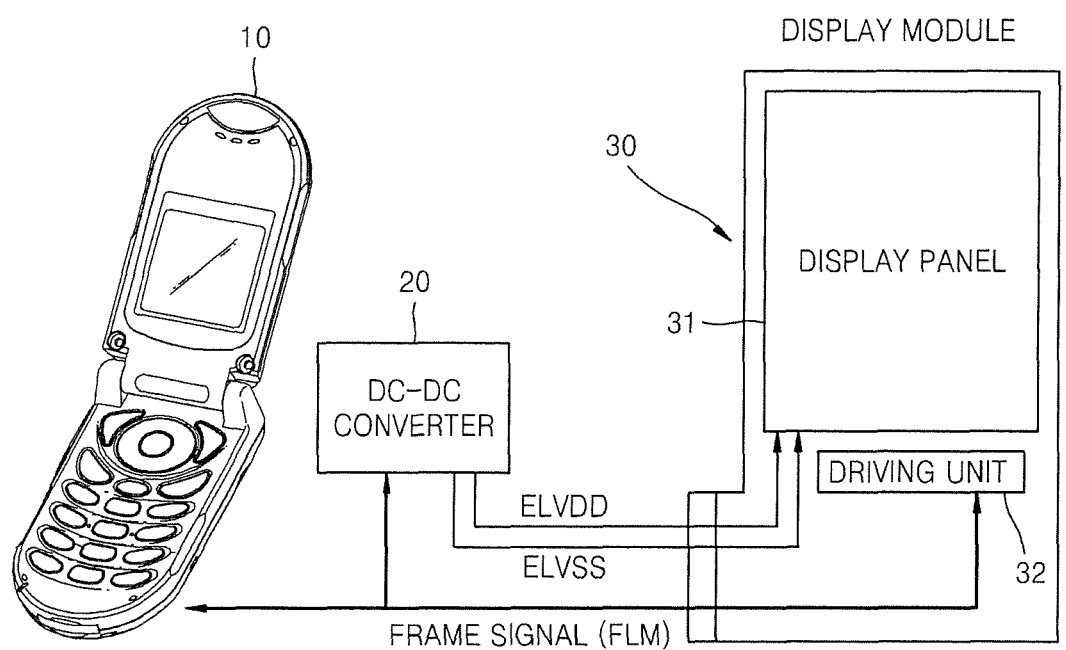
FIG. 1 is a schematic view illustrating a power control system of a display module including an external DC-DC converter, according to an embodiment of the present invention.

FIG. 1 is a schematic view illustrating a power control system of a display module 30 including an external DC-DC converter 20, according to an embodiment of the present invention. FIG. 2 is a schematic view illustrating the structure of the DC-DC converter 20 of FIG. 1, according to an embodiment of the present invention.

Referring to FIG. 1, the power control system may include a host 10, the DC-DC converter 20, and the display module 30.

The host 10 controls the whole power control system by, e.g., generating a control signal for controlling the display module 30. Also, the host 10 may generate a control signal for controlling various components (e.g., a camera and an MP3 player mounted to a mobile phone) connected to the host 10. According to an embodiment of the present invention, the control signal for controlling the display module 30 may be a frame signal FLM that identifies a frame of image data.

The host 10 includes signal input/output pins for inputting or outputting various signals and may output the control signal through a control signal output pin.

An end of a connector (not shown) is connected to the signal input/output pins of the host 10, and the other end of the connector is connected to signal input/output pins of the DC-DC converter 20 and the display module 30. Accordingly, the control signal transmitted from the host 10 may be applied to the DC-DC converter 20 and the display module 30. The connector may be a cable, and may include as many channels as required for signal transmission. For example, if five signals are to be transmitted from the host 10 to the display module 30, the connector may have five channels, and the five channels are respectively connected between the signal input/output pins of the host 10 and the display module 30.

The DC-DC converter 20 is located at the outside the display module 30, and applies a power voltage ELVDD or ELVSS to the display module 30. In more detail, the DC-DC converter 20 receives a voltage (e.g., a predetermined voltage) from a power source such as a battery, and converts the voltage into the power voltage ELVDD or ELVSS that is required by the display module 30, and applies the power voltage ELVDD or ELVSS to the display module 30.

Here, a logic circuit 21 may be included inside the DC-DC converter 20, according to an embodiment. Referring to FIG. 2, the logic circuit 21 receives a control signal from the host 10 to turn on/off the DC-DC converter 20. The control signal may be the frame signal FLM applied to the display module 30, instead of a signal such as an EL-ON signal which is applied to conventional DC-DC converters.

In the conventional appliances, the EL-ON signal is used by a host to control a DC-DC converter. A signal output pin for outputting the EL-ON signal is included in the host, and a signal input pin for inputting the EL-ON signal is included in the DC-DC converter.

However, for turning on or off the DC-DC converter 20 according to one embodiment of the present invention, a control signal generated by the host 10 utilized to control the display module 30 is used instead of the EL-ON signal. That is, according to the embodiment of the present invention, the number of control signals to be generated by the host 10 and the number of signal output pins are at least one less than in the conventional art.

Accordingly, the logic circuit 21 may turn on/off the DC-DC converter 20 according to a waveform of the control signal. For example, the logic circuit 21 may turn on/off the DC-DC converter 20 according to the number of pulses or periods of the frame signal FLM. Examples of the turning on or off the DC-DC converter 20 according to a control signal will be described in more detail with reference to FIGS. 3A, 3B, 4A and 4B.

Here, in one embodiment, the display module 30 displays an image by using image data transmitted from the outside. The display module 30 may include a display panel 31 and a driving unit 32.

The display panel 31 displays an image and may be an organic light emitting diode (OLED) panel, but it is not limited thereto, and thus, the display panel 31 may be other suitable kinds of display panels such as a liquid crystal display (LCD).

A driving unit 32 receives a control signal from the host 10 to drive the display panel 31. The driving unit 32 may include a scanning driving unit and a data driving unit. In FIG. 1, only the frame signal FLM transmitted from the host 10 to the driving unit 32 is illustrated for the convenience of description, but the present invention is not limited thereto. That is, other than the frame signal FLM, various signals or data for controlling the display module 30, such as image data and a clock signal, may be applied from the host 10 to the driving unit 32.

The display module 30 receive the power voltage ELVDD or ELVSS for driving the display panel 31 from the DC-DC converter 20. When the DC-DC converter 20 is turned on by the frame signal FLM transmitted from the host 10, the power voltage ELVDD or ELVSS may be applied to the display module 30, and the display module 30 may display an image accordingly.

As described above, by using a control signal such as the frame signal FLM to turn on/off the DC-DC converter 20, instead of an EL-ON signal which is used in the conventional art, the number of signal output pins of the host 10 and the number of control signals to be generated by the host 10 may be reduced by at least one, respectively.

Hereinafter, a method of controlling the DC-DC converter 20 with the frame signal FLM will be described.

Figure 3A:
FIGS. 3A and 3B illustrate a method of controlling a DC-DC converter, according to an embodiment of the present invention.
Figure 3B:
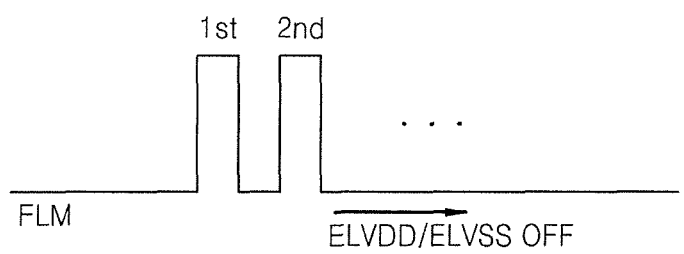

FIGS. 3A and 3B illustrate a method of controlling the DC-DC converter 20, according to an embodiment of the present invention.

Referring to FIGS. 3A and 3B, the host 10 adjusts a pulse period of a frame signal FLM to turn on/off the DC-DC converter 20.

Referring to FIG. 3A, when the host 10 increases a pulse period of a frame signal FLM and applies the frame signal FLM to the logic circuit 21 of the DC-DC converter 20, the logic circuit 21 is synchronized with a rising edge of a second pulse, thereby turning on the DC-DC converter 20. Accordingly, the DC-DC converter 20 applies a power voltage ELVDD or ELVSS to the display module 30.

Referring to FIG. 3B, when the host 10 shortens a pulse period of a frame signal FLM and applies the frame signal FLM to the logic circuit 21 of the DC-DC converter 20, the logic circuit 21 is synchronized with a rising edge of a second pulse, thereby turning off the DC-DC converter 20. Accordingly, the DC-DC converter 20 blocks a power voltage ELVDD or ELVSS from being applied to the display module 30.

As described above, by turning on or off the DC-DC converter 20 by adjusting a period of a frame signal FLM, which is a control signal applied to the display module 30, the number of signal input/output pins used in the host 10 may be reduced.

Figure 4A:
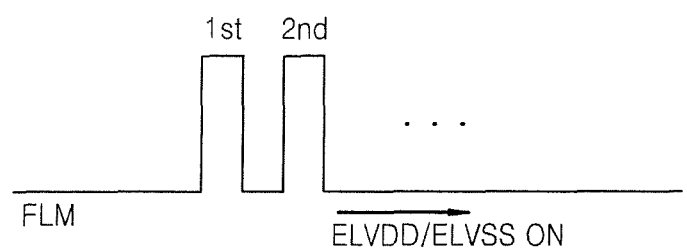
FIGS. 4A and 4B illustrate a method of controlling a DC-DC converter, according to another embodiment of the present invention.
Figure 4B:
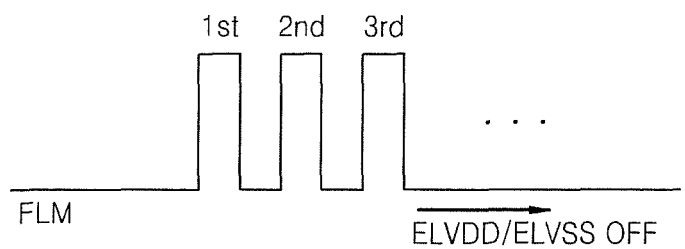

FIGS. 4A and 4B illustrate a method of controlling the DC-DC converter 20, according to another embodiment of the present invention.

Referring to FIGS. 4A and 4B, the host 10 adjusts the number of pulses of a frame signal to turn on or off the DC-DC converter 20.

Referring to FIG. 4A, when the host 10 applies a frame signal FLM with two pulses each having a certain or predetermined period to the logic circuit 21 of the DC-DC converter 20, the logic circuit 21 is synchronized with a rising edge of a second pulse, thereby turning on the DC-DC converter 20. Accordingly, the DC-DC converter 20 applies a power voltage ELVDD or ELVSS to the display module 30.

Referring to FIG. 4B, when the host 10 applies a frame signal FLM with three pulses each having the same period as the period of FIG. 4A to the logic circuit 21 of the DC-DC converter 20, the logic circuit 21 is synchronized with a rising edge of a third pulse, thereby turning off the DC-DC converter 20. Accordingly, the DC-DC converter 20 blocks a power voltage ELVDD or ELVSS from being applied to the display module 30.

As described above, turning on or off the DC-DC converter 20 by adjusting the number of pulses of a frame signal FLM, which is a control signal applied to the display module 30, the number of signal input/output pins used in the host 10 may be reduced.

The pulse period and the number of pulses described with reference to FIGS. 3A, 3B, 4A and 4B are exemplary illustrations, and the present invention is not limited thereto. That is, other suitable signals transmitted from the host 10 to the logic circuit 21 that are distinguishable as a control signal for turning on or off the DC-DC converter 20 may be used.

While the present invention has been particularly shown and described with reference to exemplary embodiments thereof, the exemplary embodiments should be considered in a descriptive sense only, and not for purpose of limitation. Thus, it will be understood by those skilled in the art that various changes may be made to the exemplary embodiments without departing from the spirit and scope of the invention as defined by the appended claims and their equivalents.

What is claimed is:

1. A power control system comprising:
    a display module for displaying an image in accordance with image data;
    a DC-DC converter being external to the display module and for applying power to the display module;
    a host comprising a plurality of signal input/output pins and for generating a control signal for controlling the display module and outputting the control signal through a single signal output pin of the signal input/output pins of the host; and
    a connector connected to the signal input/output pins and for applying the control signal to the DC-DC converter and the display module,
    wherein a frame signal for identifying a frame of image data is received from the single signal output pin by both the DC-DC converter and the display module and is applied as the control signal, and wherein the DC-DC converter is adapted to apply power to the display module according to the control signal.

2. The power control system of claim 1, wherein the DC-DC converter comprises a logic circuit adapted to receive the control signal and to turn on or off the DC-DC converter in accordance with the control signal.

3. The power control system of claim 1, wherein the host is adapted to adjust a pulse period of the frame signal and to turn on or off the DC-DC converter in accordance with the pulse period.

4. The power control system of claim 1, wherein the host is adapted to adjust a number of pulses of the frame signal and to turn on or off the DC-DC converter in accordance with the number of pulses.

5. The power control system of claim 1, wherein the display module is adapted to display an image when the DC-DC converter is turned on by the frame signal.

6. The power control system of claim 5, wherein the display module comprises:
    a display panel for displaying the image; and
    a driving unit for driving the display panel in accordance with the received control signal.

7. The power control system of claim 6, wherein the display panel comprises an organic light emitting display (OLED) panel.

* * * * *